United States Patent [19]

Ikuma et al.

[11] Patent Number: 5,386,406
[45] Date of Patent: Jan. 31, 1995

[54] CARTRIDGE SHUTTER OPENING DEVICE

[75] Inventors: Susumu Ikuma, Tokyo; Makoto Shihoh, Yokohama, both of Japan

[73] Assignee: Canon Kabushiki Kaisha, Tokyo, Japan

[21] Appl. No.: 865,890

[22] Filed: Apr. 9, 1992

[30] Foreign Application Priority Data

Apr. 15, 1991 [JP] Japan ................... 3-082400

[51] Int. Cl.⁶ ............................................ G11B 17/04
[52] U.S. Cl. ........................ 369/77.2; 360/99.02; 360/99.06
[58] Field of Search ................ 369/291, 77.2, 292; 360/99.06, 99.02, 133

[56] References Cited

U.S. PATENT DOCUMENTS

| | | | |
|---|---|---|---|
| 4,546,397 | 10/1985 | Asami et al. | 360/99.02 |
| 4,688,206 | 8/1987 | Nakagawa et al. | 369/291 |
| 4,780,868 | 10/1988 | Vignal | 360/133 |
| 4,802,041 | 1/1989 | Uehara | 360/99.02 |
| 4,901,174 | 2/1990 | Saito et al. | 360/99.06 |
| 4,964,005 | 10/1990 | Uzuki | 360/99.06 |
| 5,005,092 | 4/1991 | Shigenai et al. | 360/99.06 |

FOREIGN PATENT DOCUMENTS 02187958  7/1990  Japan .

*Primary Examiner*—Stuart S. Levy
*Assistant Examiner*—Kevin M. Watkins
*Attorney, Agent, or Firm*—Fitzpatrick, Cella, Harper & Scinto

[57] ABSTRACT

A shutter opening device has a cartridge for containing a disk-like recording medium, a first arm and a second arm. The first arm is so provided as to be able to contact a shutter leading portion of the cartridge inserted in the device and to be pivotable with the insertion operation. The second arm is provided on the first arm. The second arm is kept engaged with an end face of the shutter in a direction parallel to the inserting direction while the first arm is being pivoted, and the shutter is opened by the pivotal movement of the first arm.

4 Claims, 9 Drawing Sheets

CARTRIDGE SHUTTER OPENING DEVICE

BACKGROUND OF THE INVENTION

1. Field of the Invention

The present invention relates to a shutter opening device for a disk cartridge receiving an information recording medium such as an optical disk or an optomagnetic disk.

2. Related Background Art

As shown in FIG. 1, a conventional shutter opening device for such a disk cartridge (to be simply referred to as a cartridge hereinafter) containing an optomagnetic disk comprises a cartridge 2 containing a disk-like recording medium 1 and having a shutter 3, a cartridge holder (to be simply referred to as a holder hereinafter) 4 which is vertically moved between an inserting position (upper position) at which the cartridge 2 is horizontally inserted from a direction indicated by an arrow a, and a loading position (lower position) at which the disk-like recording medium 1 in the inserted cartridge 2 is loaded on a disk table, a pivot arm 5 mounted on the holder 4 to be pivoted about a fulcrum 4a in directions indicated by arrows b and b', a pin 7 vertically provided on the distal end of the pivot arm 5 and serving as an ejection means, and a spring 6 for biasing the pivot arm 5 in the direction indicated by the arrow b'.

The cartridge 2 is loaded in the following manner. When the cartridge 2 is horizontally inserted into the holder 4 in the direction indicated by the arrow a, the pin 7 is pushed by a leading portion 2a of the cartridge 2 and is pivoted about the fulcrum 4a by the pivot arm 5 in the direction indicated by the arrow b against the biasing force of the spring 6. As a result, a side surface portion 3a of the shutter 3 is pushed by the pin 7 to open the shutter 3 in a direction indicated by an arrow c against the biasing force of a spring (not shown) incorporated in the shutter 3. Thereafter, the pin 7 is caused to retreat into a recess 2b formed in the leading portion 2a of the cartridge 2, so that the pin 7 is locked between the side surface portion 3a of the shutter 3 and the recess 2b. A trigger arm 10 is then pivoted about a fulcrum 11 by the leading portion 2a of the cartridge 2 in a direction indicated by an arrow f against the biasing force of a spring 12 immediately before the cartridge 2 is completely inserted in the holder 4 and the cartridge leading portion 2a is brought into contact with a bent portion (stopper) 4b formed on the holder 4. As a result, the holder 4 is moved downward to the loading position, thus completing the loading operation.

When the cartridge 2 is to be ejected, the holder 4 is completely moved upward from the loading position to the inserting position to release the lock. The cartridge leading portion 2a is slightly pushed in the direction indicated by the arrow a' by the trigger arm 10 which is pivoted about the fulcrum 11 in a direction indicated by f' by the spring 12, thus withdrawing the pin 7 from the cartridge recess 2b onto the leading portion 2a. Subsequently, the cartridge leading portion 2a is pushed by the pin 7 which is pivoted about the fulcrum 4a in the direction indicated by the arrow b' by the spring 6 upon operation of the pivot arm 5. As a result, the cartridge 2 is ejected from the holder 4 in the direction indicated by the arrow a' while the shutter 3 is closed in a direction indicated by an arrow c' by the built-in spring.

FIG. 2 shows another conventional shutter opening device for a cartridge containing a floppy disk. This device is almost the same as the one shown in FIG. 1, which is designed for an optomagnetic disk, except that a fulcrum 4a is formed outside the loading position of a cartridge 2 (behind the loading position), and the shutter is opened while the pivot arm 5 is pushed.

In the conventional device shown in FIG. 1, since the fulcrum 4a is located above the cartridge 2, the pivot arm 5 overlaps the cartridge 2. Similarly, the spring 6 for biasing the pivot arm 5 overlaps the cartridge 2 regardless of whether the spring 6 is a coil or torsion spring. This makes it difficult to realize a low-profile shutter opening device.

In the conventional device shown in FIG. 2, which is designed for a floppy disk, since the pivot arm 5 is located outside the cartridge 2, the pivot 5 and the spring 6 do not overlap the cartridge 2. This allows the formation of a flat structure and hence realizes a low-profile device. However, such a structure is only allowed for a floppy disk but cannot be applied to an optomagnetic disk. This is because an optomagnetic disk requires a larger opening in the cartridge than a floppy disk because of the structure of a recording/reproducing head, and the stroke of movement of the shutter 3 of the device for the optomagnetic disk is larger than that of the device for the floppy disk. More specifically, the initial position of the side surface portion (driving point) 3a of the shutter 3 is located near the side surface portion of the cartridge 2. Consequently, a moment angle 8 of the pivot arm 5 is increased, and the pivot arm 5 cannot be pivoted. The moment angle 8 is an angle defined by a vector d of movement of the pin 7 (pivot arm 5) and the inserting direction. As the moment angle $\theta$ is decreased, the shutter is opened more easily. When the angle is 90°, the shutter cannot be opened A moment angle $\theta$b of the pivot arm 5 for the floppy disk can be set to be 60° or less. In this case, when the cartridge 2 is inserted, the pin 7 or the pivot arm 5 can be sufficiently pivoted by the cartridge leading portion 2a. A moment angle $\theta$a of the pivot arm 5 for the optomagnetic disk shown in FIG. 1 is about 45°. If a fulcrum 4a' is arranged outside the cartridge 2, as shown in FIG. 2, a moment angle $\theta$a' is close to 90°. Therefore, when the cartridge 2 is inserted, the cartridge leading portion 2a and the pivot arm 5 push each other, and the pivot arm 5 cannot be pivoted. In order to increase the moment angle $\theta$a', the fulcrum 4a' must be arranged outside the holder 4 or the pivot arm 5 must be extremely elongated.

SUMMARY OF THE INVENTION

The present invention has been made in consideration of the above situation, and has as its object to provide a compact, low-profile cartridge shutter opening device capable of smoothly opening a cartridge shutter.

In order to achieve the above object, according to the present invention, there is provided a shutter opening device for opening an opening/closing shutter of a cartridge containing a disk-like recording medium, comprising a first arm which can be brought into contact with a shutter leading portion of the cartridge inserted in the device and can be pivoted upon interlocking with an inserting operation of the cartridge, and a second arm which is engaged with an end face of the shutter parallel to an inserting direction while the first arm is pivoted, and which opens the shutter upon interlocking with the pivotal movement of the first arm.

DETAILED DESCRIPTION OF THE PREFERRED EMBODIMENT

Figure 3:
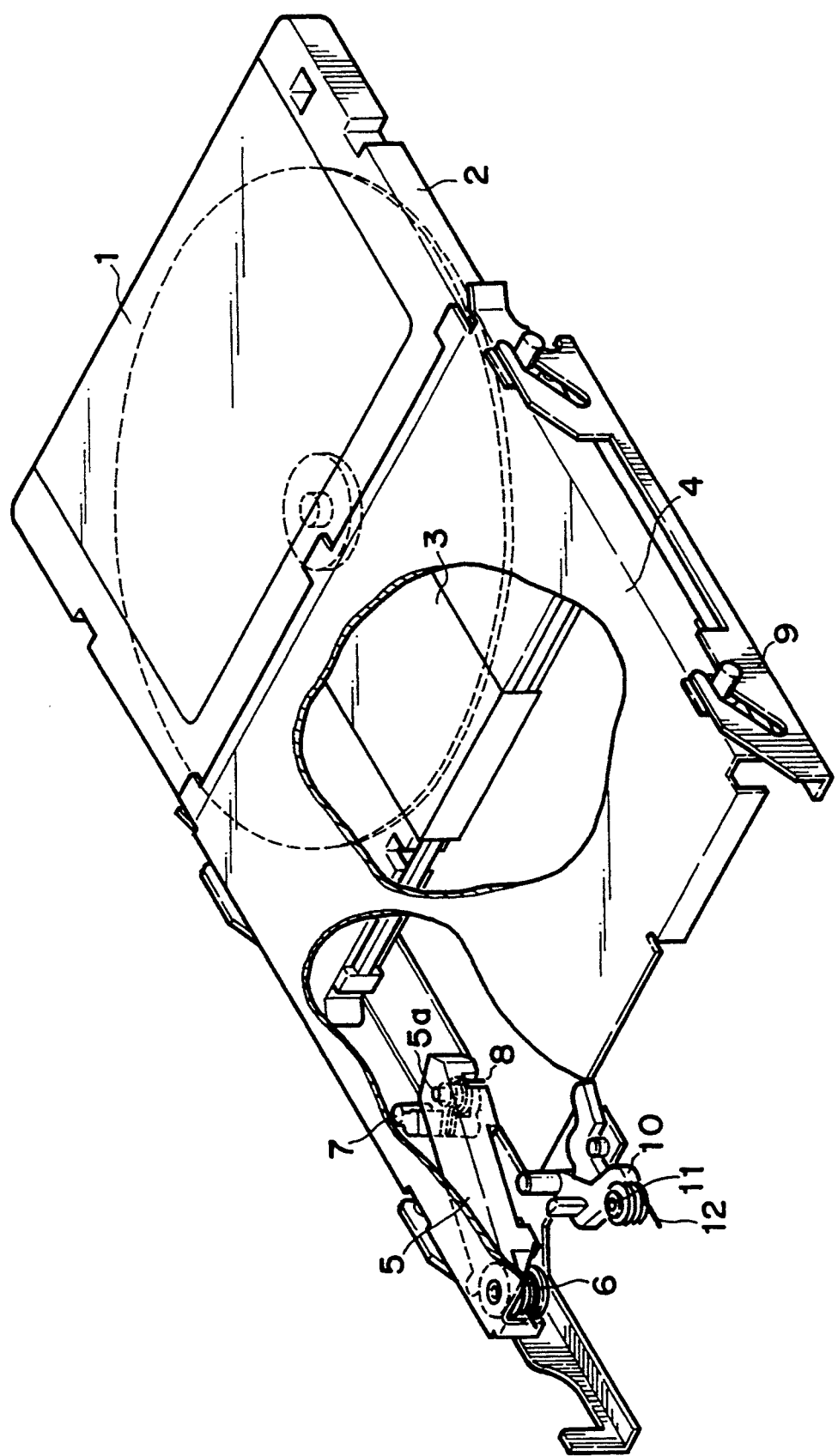
FIG. 3 is a perspective view showing a cartridge shutter opening device according to the first embodiment of the present invention in a state before a cartridge is loaded.
Figure 4:
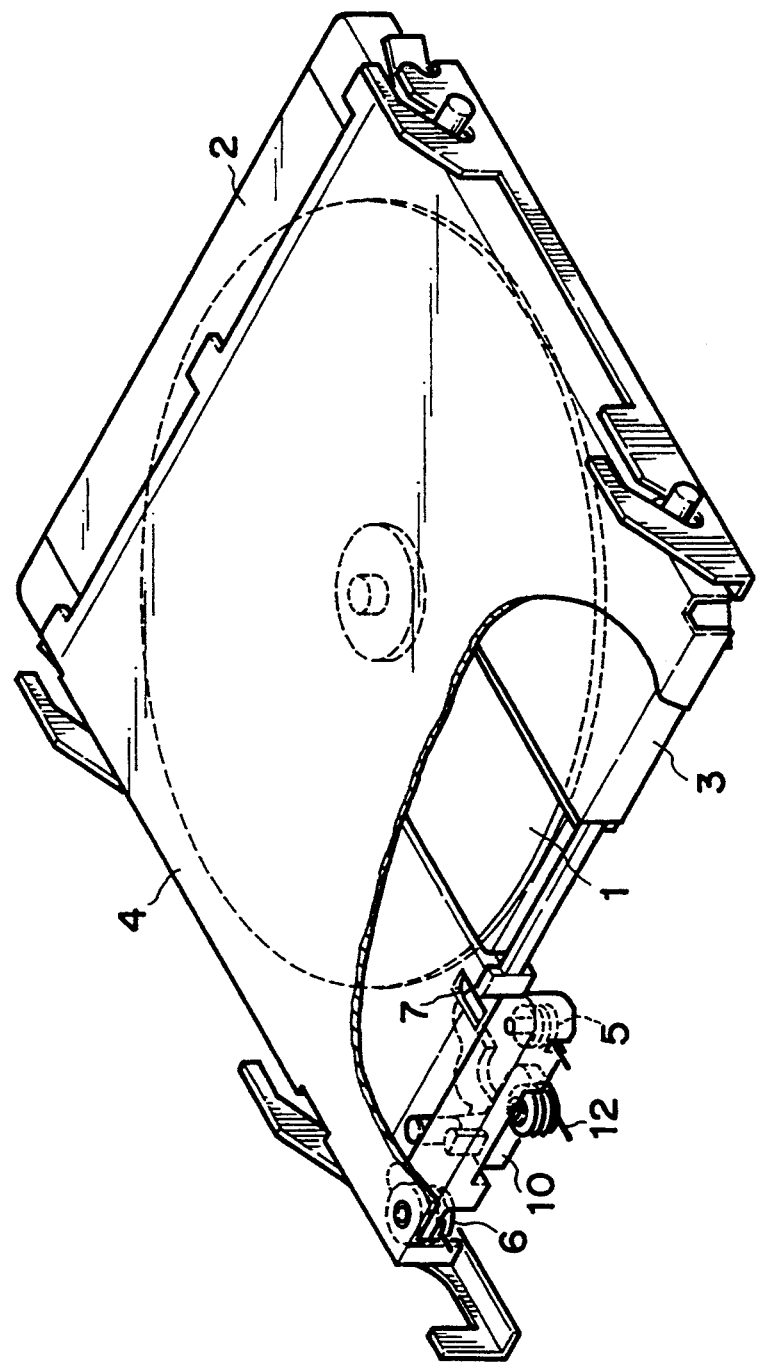
FIG. 4 is a perspective view showing the cartridge shutter opening device according to the first embodiment of the present invention in a state after the cartridge is loaded.

A cartridge shutter opening device according to an embodiment of the present invention, which is applied to an optomagnetic disk unit, will be described below with reference to the accompanying drawings. FIG. 3 is a perspective view of the cartridge shutter opening device in a state before a cartridge is loaded. FIG. 4 is a perspective view of the device in a state after the cartridge is loaded.

Referring to FIGS. 3 and 4, a disk-like recording medium 1 is contained in a cartridge 2. A shutter 3 is slidably supported on the cartridge 2. The shutter opening device further includes a holder 4, a pivot arm (first arm) 5, a spring 6, an L-shaped hook pin (second arm) 7 as an ejection means, a spring 8, guide cams 9, a trigger arm 10, and a spring 12. The holder 4 is vertically moved between an inserting position (upper position), at which the cartridge 2 is horizontally inserted into a drive unit, and a loading position (lower position), at which the disk-like recording medium 1 in the cartridge 2 is loaded on a disk table of the drive unit. The pivot arm (first arm) 5 is mounted on the holder 4 to be pivoted about a fulcrum 4a. The spring 6 serves to bias the pivot arm 5 in a cartridge ejecting direction a'. The hook pin 7 is pivoted about a second fulcrum 5a on the distal end portion of the pivot arm 5. The spring 8 serves to bias the hook pin (second arm) 7 in the cartridge ejecting direction a'. The guide cams 9 serve to move the holder 4 vertically in a cartridge loading-/ejecting operation. The trigger arm 10 supports the guide cam 9 and pivots about a fulcrum 11. The spring 12 serves to bias the trigger arm 10.

Figure 5:
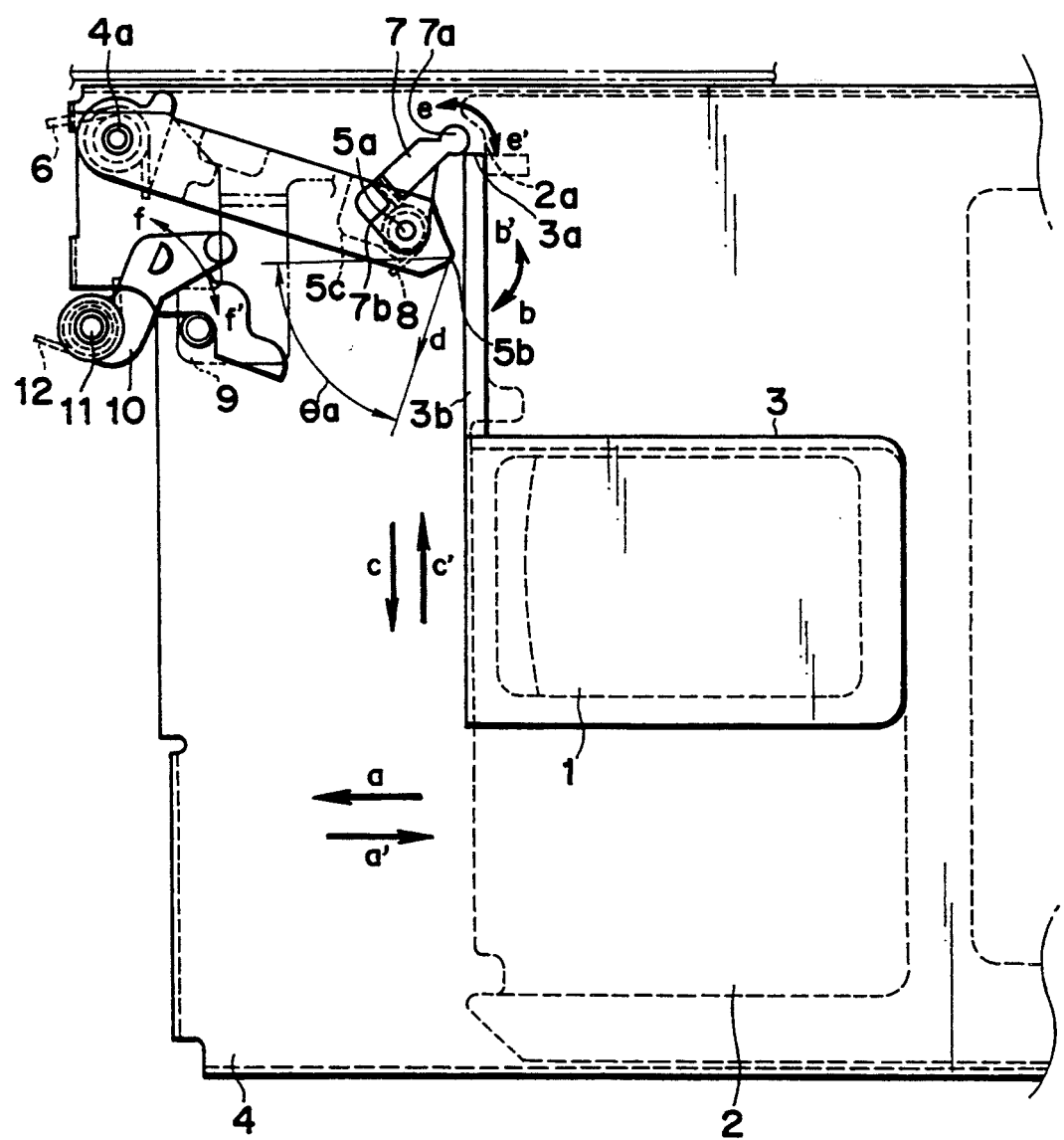
FIG. 5 is a plan view showing the first step of inserting the cartridge into the cartridge shutter opening device of the present invention shown in FIG. 3.

An operation of the cartridge shutter opening device having the above-described arrangement will be described next with reference to FIGS. 5 to 9. FIG. 5 shows an initial state of insertion of the cartridge 2. In this state, the cartridge 2 is horizontally inserted into the holder 4 from a direction indicated by an arrow a. A leading portion 2a of the cartridge 2 and a distal end portion 7a (contact pin) of the hook pin 7 are brought into contact with each other first. However, since the hook pin 7 pivots about the pivot arm fulcrum 5a in a direction indicated by an arrow e against the biasing force of the spring 8, the hook pin distal end portion 7a does not push a shutter side surface portion 3a, and the pivot arm 5 does not pivot. When the cartridge 2 is further inserted, a distal end portion 5b of the pivot arm 5 comes into contact with the leading portion of the cartridge 2, specifically a leading portion 3b of the shutter 3. At this time, the position where the distal end portion 5b of the pivot arm 5 is brought into contact with the shutter leading portion 3b is located inward from the side surface portion 3a (an end face of the shutter 3 which is parallel to the inserting direction of the cartridge 2) of the shutter 3. When the shutter leading portion 3b pushes the distal end portion 5b of the pivot arm 5, the pivot arm 5 starts to pivot about the fulcrum 4a against the biasing force of the spring 6. Upon pivoting of the pivot arm 5, the hook pin 7 is integrally moved in a direction indicated by an arrow b. Upon interlocking with this movement, the side surface portion 3a of the shutter 3 is pushed by the hook pin distal end portion 7a, and the shutter 3 starts to open in a direction indicated by an arrow c against the biasing force of a spring (not shown) incorporated in the shutter 3. A moment angle $\theta a$ (defined by the inserting direction and the moving vector of the first pivot arm) defined by the pivot arm distal end portion 5b at the start of a shutter opening operation can be set to be 70° or less by adjusting the contact position between the distal end portion 5b of the pivot arm 5 and the shutter leading portion 3b, thereby preventing the pivot arm 5 and the cartridge 2 from pushing each other. With this operation, the pivot arm 5 starts to pivot smoothly.

Figure 1:
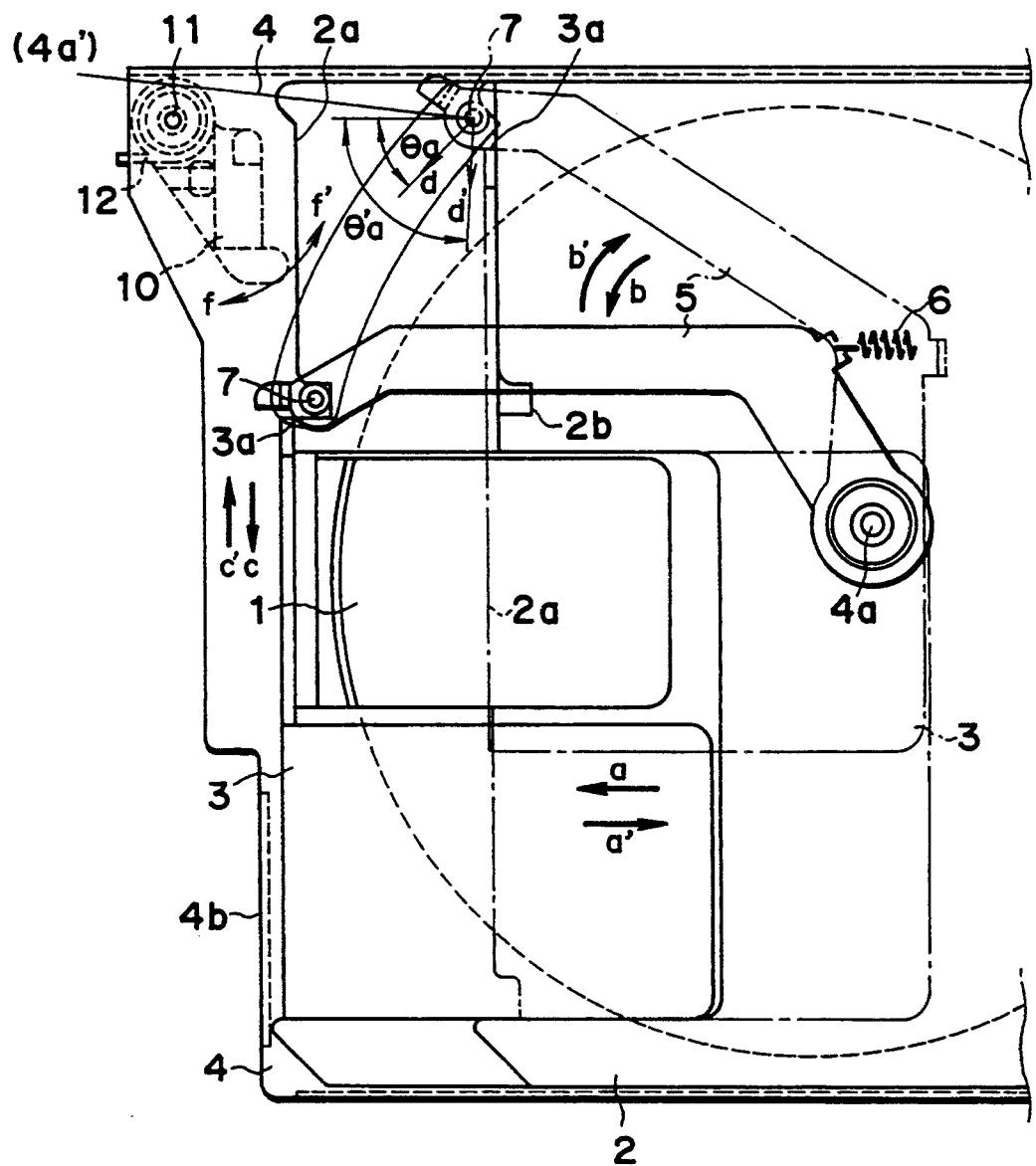
FIG. 1 is a plan view showing a conventional cartridge shutter opening device for an optomagnetic disk.
Figure 2:
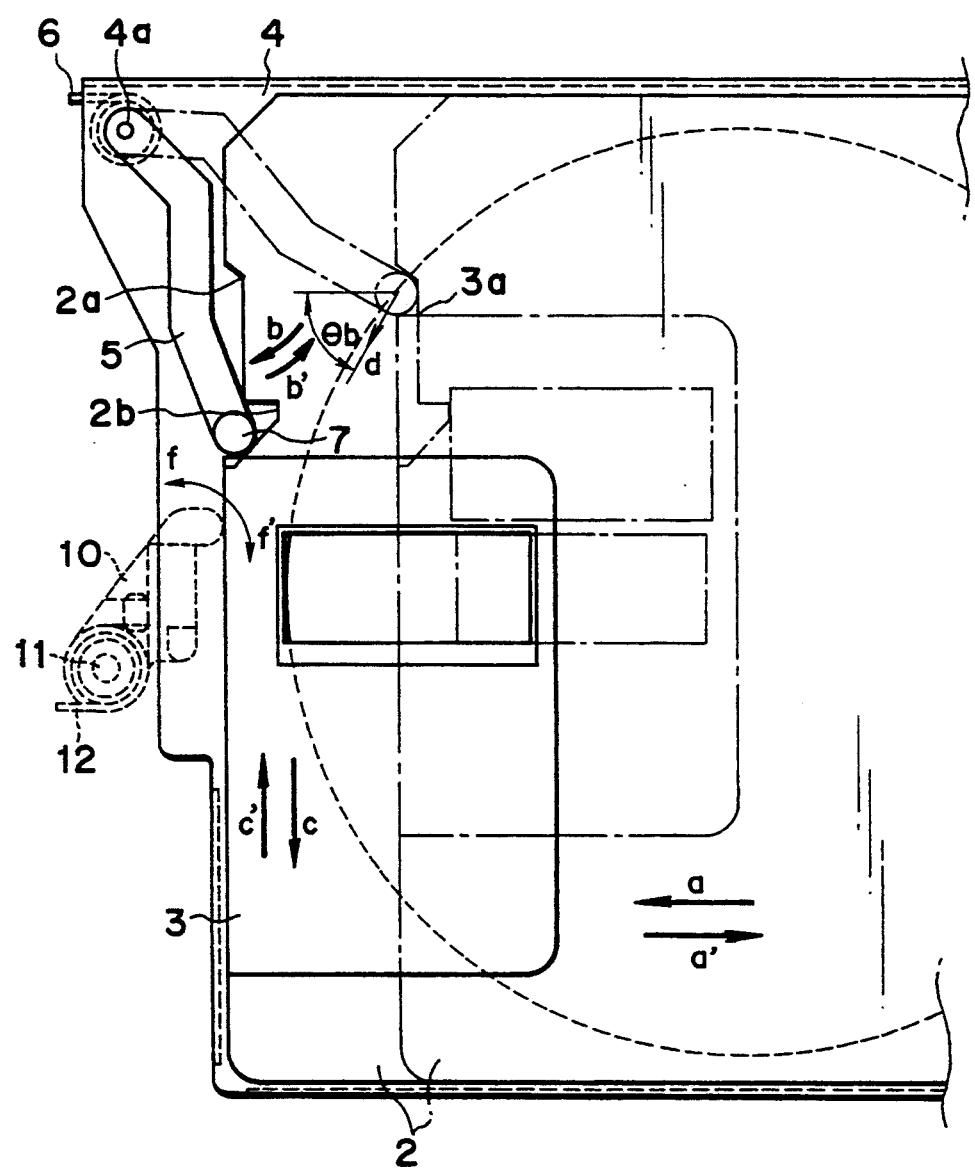
FIG. 2 is a plan view showing a conventional cartridge shutter opening device for a floppy disk.
Figure 6:
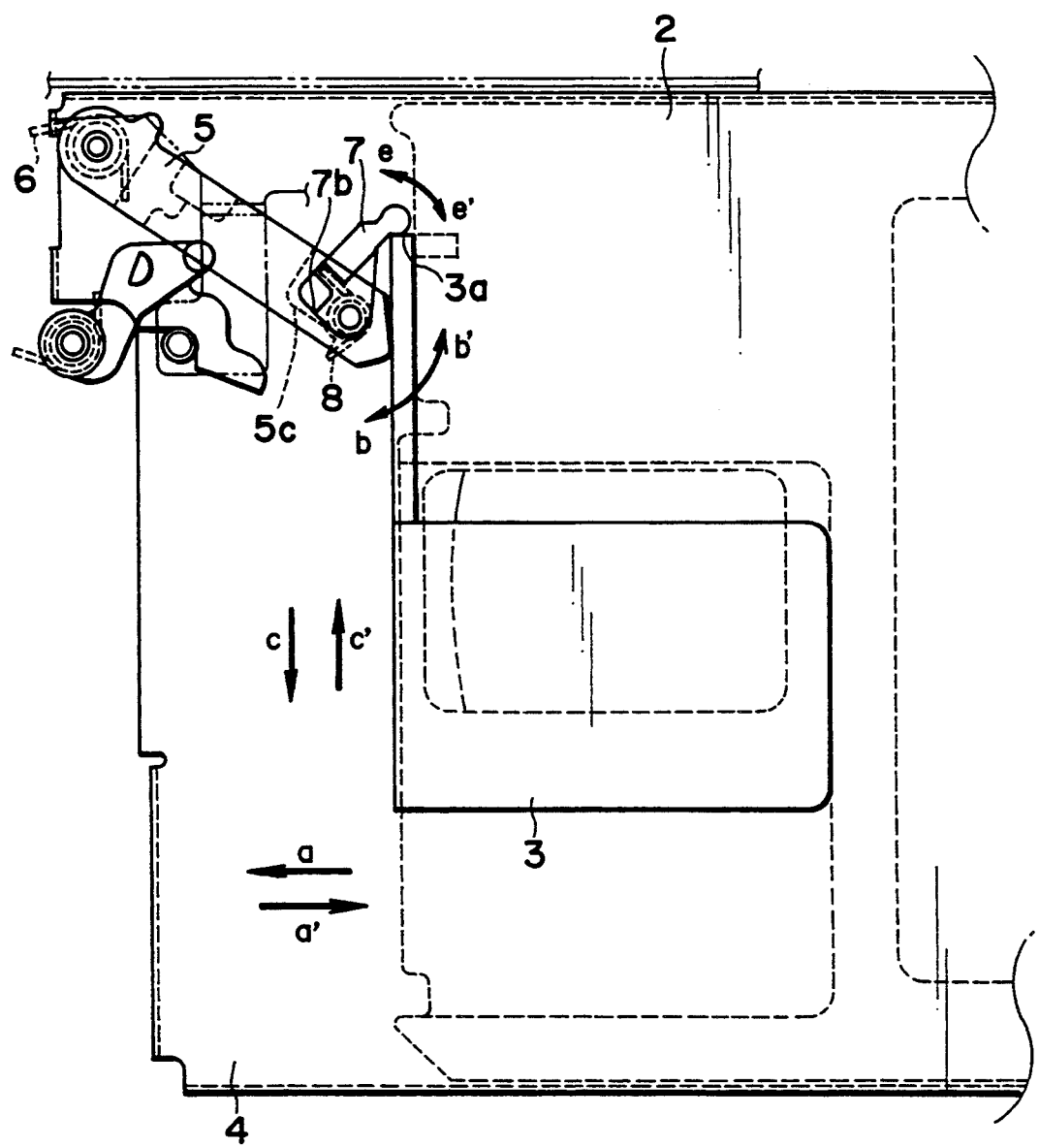
FIG. 6 is a plan view showing the second step of inserting the cartridge into the cartridge shutter opening device of the present invention shown in FIG. 3.
Figure 7:
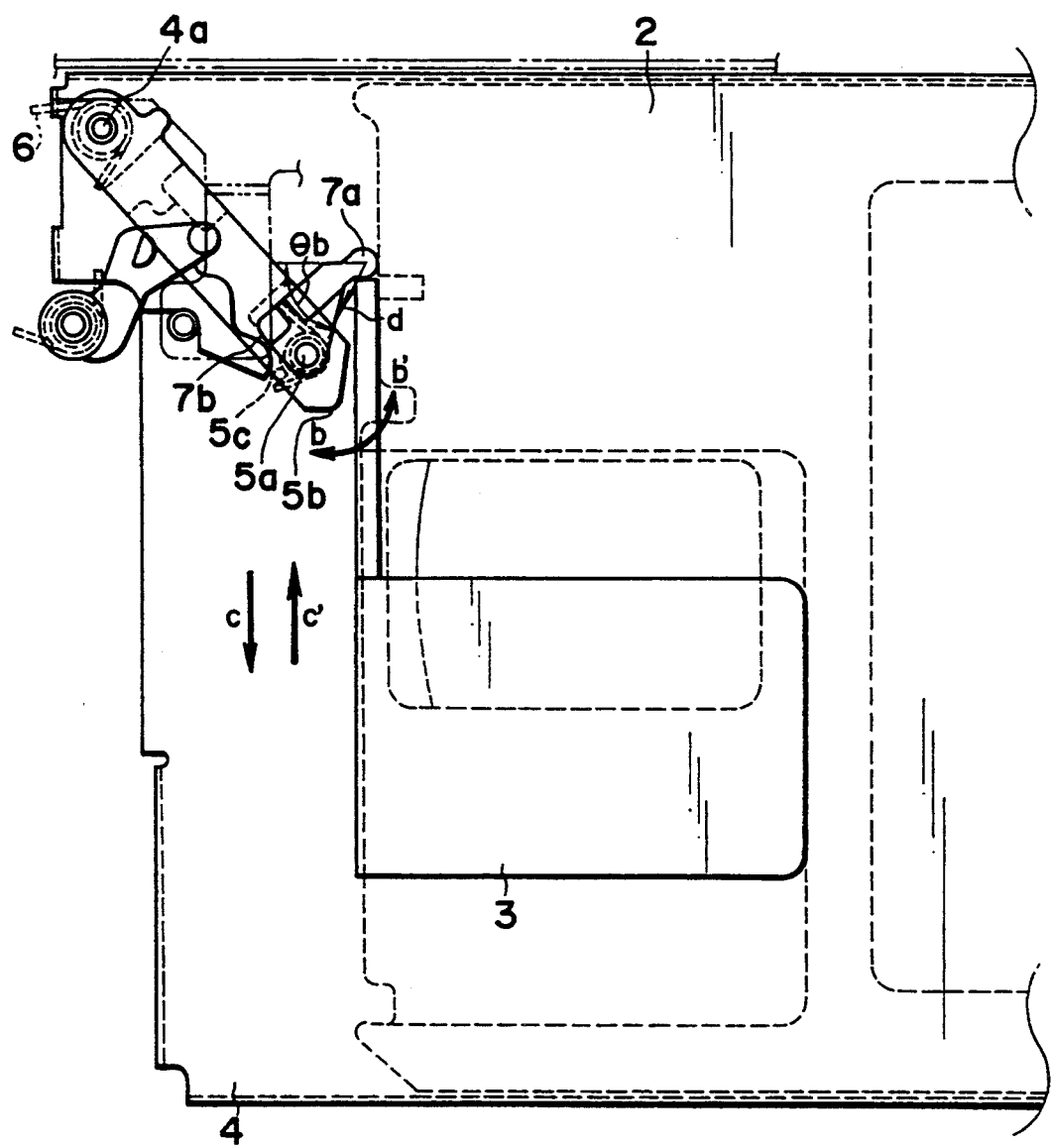
FIG. 7 is a plan view showing the third step of inserting the cartridge into the cartridge shutter opening device of the present invention shown in FIG. 3.

FIG. 6 shows a state wherein the cartridge 2 is further inserted into the holder 4. Upon movement of the cartridge 2, the pivot arm 5 pivots in the direction indicated by the arrow b against the biasing force of the spring 6. At the same time, the hook pin 7 pushes the shutter side surface portion 3a to gradually open the shutter 3 in the direction indicated by the arrow c, while pivoting in the direction indicated by the arrow e against the biasing force of the spring 8. When the cartridge 2 is further inserted to the position shown in FIG. 7, a stopper wall portion 5c formed on the pivot arm 5 is brought into contact with an L-shaped side surface portion 7b of the hook pin 7, so that the hook pin 7 can no longer pivot about the fulcrum 5a. As a result, the hook pin 7 starts to pivot about the fulcrum 4a in the direction indicated by the arrow b together with the pivot arm 5. At this time, a moment angle $\theta b$ (defined by the inserting direction and the moving vector of the second pivot arm) defined by the hook pin distal end portion 7a becomes 65° or less, thus allowing a sufficiently smooth pivotal movement. Since the pivot arm 5 and the hook pin 7 integrally pivot thereafter, almost the same operation as that described with reference to the conventional device shown in FIG. 2, which is designed for a floppy disk, will be performed.

Figure 8:
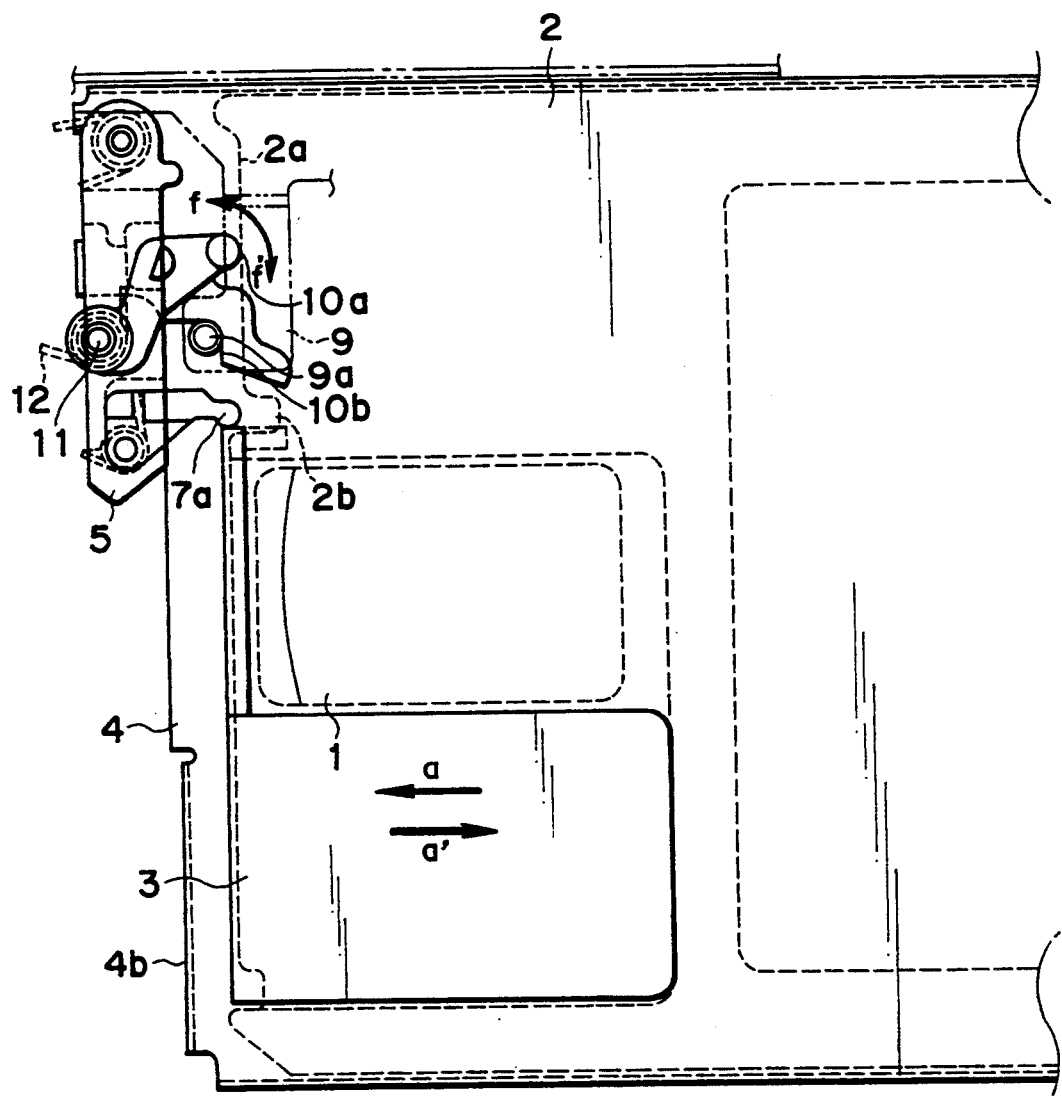
FIG. 8 is a plan view showing the fourth step of inserting the cartridge into the cartridge shutter opening device of the present invention shown in FIG. 3.
Figure 9:
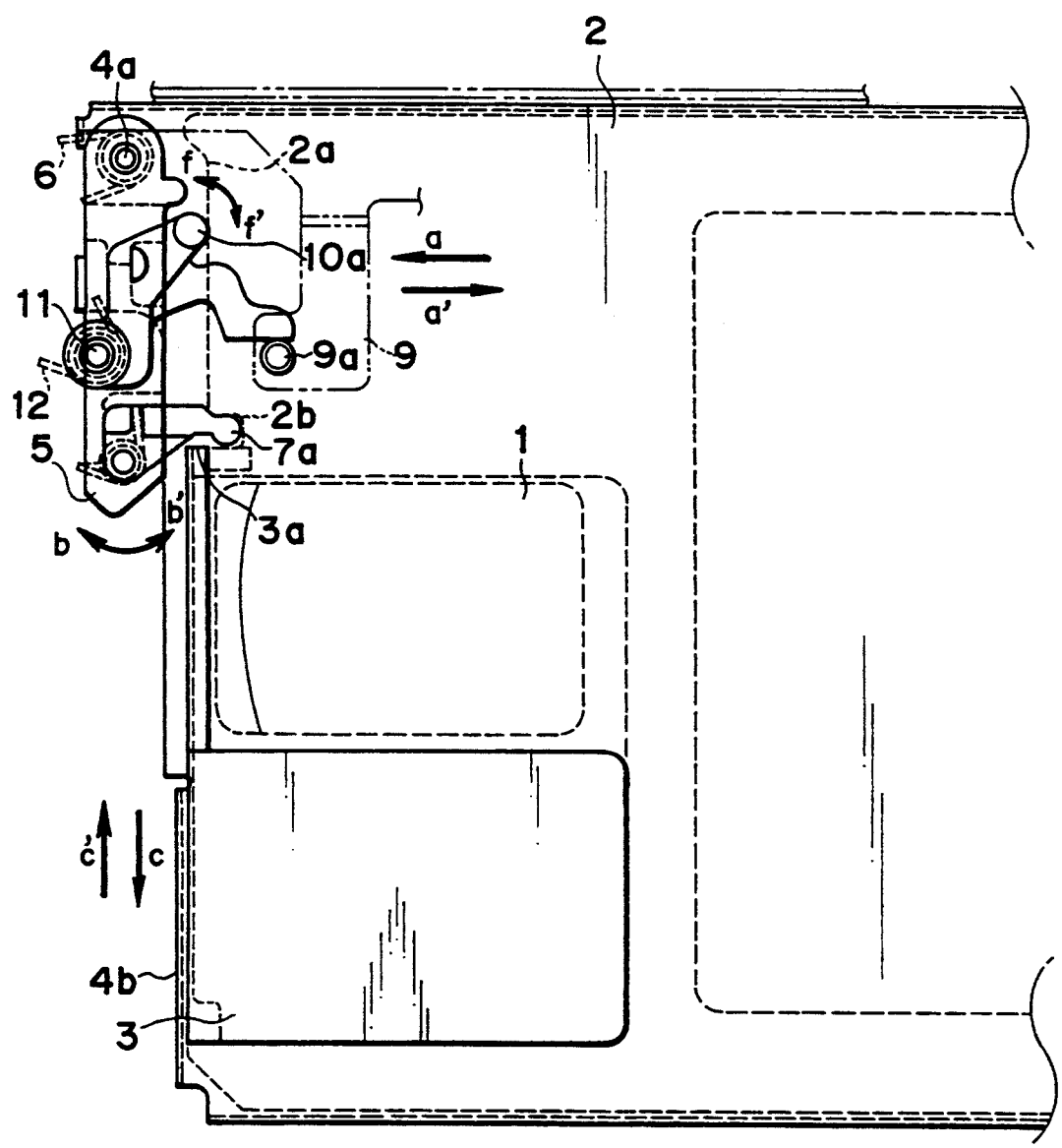
FIG. 9 is a plan view showing the fifth step of inserting the cartridge into the cartridge shutter opening device of the present invention shown in FIG. 3.

FIG. 8 shows a state wherein the cartridge 2 is further inserted into the holder 4. At this position, the leading portion 2a of the cartridge 2 pushes a distal end portion 10a of the trigger arm 10 to cause it to pivot about the fulcrum 11 in a direction indicated by an arrow a against the biasing force of the spring 12. Before this operation, since a hook portion 10b of the trigger arm 10 is locked by a pin 9a formed on the guide cam 9, the guide cam is not operated (the guide cam is biased in the direction indicated by the arrow a' by a spring (not shown)). When the cartridge 2 is further inserted, and the distal end portion 7a of the hook pin 7 is caused to retreat into a recess 2b formed in the leading portion of the cartridge 2, as shown in FIG. 9, the pin 7 is locked between the side surface portion 3a of the shutter 3 and the recess 2b. The trigger arm 10 is then pivoted in the direction indicated by the arrow f immediately before the cartridge 2 is completely inserted into the holder 4 and the leading portion 2a of the cartridge 2 is brought into contact with a bent portion (stopper) 4b formed on the holder 4. As a result, the guide cam pin 9a is released from the hook portion 10b of the trigger arm 10, and the guide cam 9 is moved in the direction indicated by the arrow a' by a spring (not shown). In this case, when four support shafts provided on side surfaces of the holder 4 are moved along guide grooves formed in the guide cams 9 (see FIGS. 3 and 4), the holder is moved downward to the loading position, thereby completing the loading operation.

When the cartridge 2 is to be ejected, the guide cams 9 are pushed (pulled) in the direction indicated by the arrow a by using an ejecting mechanism (not shown) so as to completely move the holder 4 from the loading position to the inserting position. As a result, the lock is released, and the cartridge leading portion 2a is slightly pushed in the direction indicated by the arrow a' by the trigger arm 10, which is pivoted about the fulcrum 11 in the direction indicated by the arrow e' by the spring 12, thereby withdrawing the hook pin 7 from the cartridge recess 2b onto the leading portion 2a. Subsequently, the cartridge leading portion 2a is pushed by the pivot arm 5 or the hook pin 7, which is pivoted about the fulcrum 4a in the direction indicated by the arrow b' by the spring 6 upon operation of the pivot arm 5. As a result, the cartridge 2 is ejected from the holder 4 in the direction indicated by the arrow a' while the shutter 3 is closed in a direction indicated by an arrow c' by the built-in spring.

An embodiment of the present invention has been described above. However, the present invention is not limited to the above-described embodiment. Various changes and modifications may be made within the spirit and scope of the present invention.

In addition, the present invention is not limited to an optomagnetic disk unit but can be applied to cartridge shutter opening devices for various types of disk units.

In the above-described cartridge shutter opening device of the present invention, the means for opening the cartridge shutter can be realized with a simple arrangement without stacking components on the cartridge holder. In addition, since the shutter opening means and the cartridge do not overlap upon loading of the cartridge, a reduction in profile, size, and cost of the overall device can be achieved.

What is claimed is:

1. A shutter opening device for opening an opening/closing shutter of a disk cartridge having a cartridge case accommodating a disk-like recording medium therein, the opening/closing shutter being movable on the cartridge case and having a side end portion near a side surface of the cartridge case, said device comprising:

a rigid first arm for abutting against a shutter leading portion of the cartridge when inserted in said device, and for pivoting in a first direction in association with an insertion operation of the cartridge;
a rigid second arm, provided on said first arm, for abutting against the side end portion of the shutter of the cartridge when inserted in said device, the entire rigid second arm pivoting in a second direction about a pivoting point provided on said first arm as the pivoting center
a stopper, formed as a recessed portion within said first restricting the pivoting of said second arm; and
biasing means, provided on said first arm, for biasing said second arm in the first direction,
wherein (i) when the cartridge is initially inserted in said device, the side end portion of the shutter first comes into contact with said second arm to pivot said second arm only in the second direction against the biasing force of said biasing means in association with the insertion operation of the cartridge, without pivoting said first arm, (ii) further insertion of the cartridge into said device causes said first arm to abut against said shutter and to pivot, the pivoting of said first arm causing said second arm to move entirely in the first direction, and the movement of said second arm causing said second arm to pivot on said first arm so as to open the shutter, (iii) further insertion of said cartridge into said device causes said second arm to abut against said stopper so as to no longer pivot on said first arm and the contact of said first arm with the shutter to be released, and (iv) thereafter, a force acting on said second arm in an insertion direction causes said first arm to pivot, which causes said second arm to move entirely in the first direction so as to open the shutter.

2. A device according to claim 1, wherein a moment angle of said first arm at an initial position is set to be not more than 70°.

3. A magnetooptical disk apparatus having a shutter opening mechanism for opening an opening/closing shutter of a disk cartridge that includes a carriage case accommodating a disk-like recording medium therein, the opening/closing shutter being movable on the cartridge case and having a side end portion near a side surface of the cartridge case, said apparatus comprising:

a rigid first arm for abutting against a shutter leading portion of the cartridge when inserted in said apparatus, and for pivoting in a first direction in association with an insertion operation of the cartridge;
a rigid second arm, pivotably provided on said first arm, for abutting against the side end portion of the shutter of the cartridge when inserted in said apparatus, the entire rigid second arm pivoting in a second direction about a pivoting point provided on said first arm as the pivoting center;
a stopper, formed as a recessed portion within said first arm, for restricting the pivoting of said second arm; and
biasing means, provided on said first arm, for biasing said second arm in the first direction,
wherein (i) when the cartridge is initially inserted in said apparatus, the side end portion of the shutter first comes into contact with said second arm to pivot said second arm only in the second direction against the biasing force of said biasing means in association with the insertion operation of the cartridge, without pivoting said first arm, (ii) further insertion of the cartridge into said apparatus causes said first arm to abut against the shutter and to pivot, the pivoting of said first arm causing said second arm to move entirely in the first direction, and the movement of said second arm causing said second arm to pivot on said first arm so as to open the shutter, and (iii) still further insertion of said cartridge into said apparatus causes said second arm to abut against said stopper so as to no longer pivot on said first arm and the contact of said first arm with the shutter to be released, and (iv) thereafter, a force acting on said second arm in an insertion direction causes said first arm to pivot, which causes said second arm to move entirely in the first direction so as to open said shutter.

4. An apparatus according to claim 3, wherein a moment angle of said first arm at an initial position is set to be not more than 70°.

* * * * *

UNITED STATES PATENT AND TRADEMARK OFFICE
CERTIFICATE OF CORRECTION

PATENT NO. : 5,386,406
DATED : January 31, 1995
INVENTOR(S) : Susumu IKUMA, et al.

It is certified that error appears in the above-indentified patent and that said Letters Patent is hereby corrected as shown below:

On title page, item [56],

UNDER "FOREIGN PATENT DOCUMENTS":

"02187958 7/1990 Japan" should read --02-187958 7/1990 Japan--.

COLUMN 2:

Line 35, "opened" should read --opened.--.

COLUMN 6:

Line 10, "center" should read --center;--; and
Line 12, "first" should read --first arm, for--.

Signed and Sealed this

Twenty-fifth Day of April, 1995

Attest:

BRUCE LEHMAN

*Attesting Officer*        *Commissioner of Patents and Trademarks*